United States Patent
Quach et al.

(10) Patent No.: US 11,175,041 B2
(45) Date of Patent: Nov. 16, 2021

(54) SYSTEMS AND METHODS FOR COMBUSTOR PANEL

(71) Applicant: UNITED TECHNOLOGIES CORPORATION, Farmington, CT (US)

(72) Inventors: San Quach, East Hartford, CT (US); John S. Tu, West Hartford, CT (US); Robert M. Sonntag, Bolton, CT (US); Robert Selinsky, Jr., Moodus, CT (US); John J. Rup, Jr., Willington, CT (US); Anthony Van, Palm City, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 221 days.

(21) Appl. No.: 16/598,941

(22) Filed: Oct. 10, 2019

(65) Prior Publication Data

US 2020/0041125 A1 Feb. 6, 2020

Related U.S. Application Data

(62) Division of application No. 15/238,443, filed on Aug. 16, 2016, now Pat. No. 10,480,788.

(51) Int. Cl.
*F23R 3/00* (2006.01)

(52) U.S. Cl.
CPC ............ *F23R 3/002* (2013.01); *F23R 3/007* (2013.01); *F23R 2900/00018* (2013.01); *F23R 2900/03043* (2013.01); *F23R 2900/03044* (2013.01); *Y02T 50/60* (2013.01)

(58) Field of Classification Search
CPC ............ F23R 3/002; F23R 3/007; F23R 2900/00018; F23R 2900/00019; F23R 2900/03045; F23R 2900/03043; F23R 2900/03044; F05D 2230/30; F05D 2230/312; F05D 2230/313; F05D 2230/90; F05D 2260/2212; F05D 2260/2214; F05D 2300/611; F02C 7/24; F02C 7/30; F01D 5/286; F01D 5/288; F01D 25/007; F01D 25/12; F01D 25/08
See application file for complete search history.

(56) References Cited

U.S. PATENT DOCUMENTS

| 6,274,215 B1 | 8/2001 | Brainch |
| 2006/0117755 A1* | 6/2006 | Spooner ................. F23R 3/002 60/752 |
| 2007/0193216 A1 | 8/2007 | Woolford |

(Continued)

FOREIGN PATENT DOCUMENTS

WO 2015112473 7/2015

OTHER PUBLICATIONS

European Patent Office, European Search Report dated Jun. 1, 2018 in Application No. 17184338.6-1008.

(Continued)

*Primary Examiner* — Andrew H Nguyen
(74) *Attorney, Agent, or Firm* — Snell & Wilmer L.L.P.

(57) ABSTRACT

A combustor panel of a combustor may include a combustion facing surface, a cooling surface opposite the combustion facing surface, and heat transfer pins extending from the cooling surface. A grouping of the heat transfer pins may include a metallic coating.

8 Claims, 6 Drawing Sheets

(56) References Cited

U.S. PATENT DOCUMENTS

2010/0247740 A1   9/2010  Reitz
2013/0291382 A1  11/2013  Kinstler
2014/0174091 A1   6/2014  Ivory
2016/0370008 A1  12/2016  Drake

OTHER PUBLICATIONS

USPTO, Restriction/Election Requirement dated Sep. 27, 2018 in U.S. Appl. No. 15/238,443.
USPTO, Non-Final Office Action dated Feb. 11, 2019 in U.S. Appl. No. 15/238,443.
USPTO, Final Office Action dated Jun. 17, 2019 in U.S. Appl. No. 15/238,443.
USPTO, Notice of Allowance dated Aug. 28, 2019 in U.S. Appl. No. 15/238,443.

* cited by examiner

SYSTEMS AND METHODS FOR COMBUSTOR PANEL

CROSS-REFERENCE TO RELATED APPLICATIONS

This application is a divisional of, claims priority to and the benefit of, U.S. Ser. No. 15/238,443 filed Aug. 16, 2016 and entitled "SYSTEMS AND METHODS FOR COMBUSTOR PANEL," which is incorporated herein by reference in its entirety for all purposes.

FIELD

The present disclosure relates to gas turbine engines, and more specifically, to combustor panels used in a combustor of a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Combustors used in gas turbine engines rely on combustor panels as thermal shields and to guide combustion gases into the turbine. These combustor panels interface with hot combustion gases and are often susceptible to structural damage and/or oxidation caused by the high temperature of the combustion gases. The structural damage and/or oxidation of the combustor panels may result in the combustor having a short operational life.

SUMMARY

In various embodiments, the present disclosure provides a combustor panel of a combustor. The combustor panel may include a combustion facing surface, a cooling surface opposite the combustion facing surface, and heat transfer pins extending from the cooling surface, wherein a grouping of the heat transfer pins includes a metallic coating. In various embodiments, the grouping of the heat transfer pins is an aft grouping that includes at least one row of the heat transfer pins adjacent an aft edge of the combustor panel. In various embodiments, a forward grouping of the heat transfer pins is uncoated. In various embodiments, a first circumferential distance between adjacent heat transfer pins having the metallic coating in the aft grouping is less than a second circumferential distance between adjacent heat transfer pins in the forward grouping. For example, the first circumferential distance may be between about 0.010 inches and about 0.040 inches. In various embodiments, the first circumferential distance may be less than about 0.020 inches. In various embodiments, the aft grouping of the heat transfer pins includes between one and five rows of the heat transfer pins adjacent an aft edge of the combustor panel.

According to various embodiments, combustor panel is an aft combustor panel. The metallic coating may be a first stage bond coating applied to the combustion facing surface. In various embodiments, the metallic coating may be disposed on an aft portion and a lateral portion of the aft grouping of the heat transfer pins. In various embodiments, a forward portion of the aft grouping of the heat transfer pins is uncoated.

Also disclosed herein, according to various embodiments, is a combustor of a gas turbine engine. The combustor may include an outer shell, an inner shell, an outer combustor panel mounted to and radially inward of the outer shell and comprising a plurality of heat transfer pins, and an inner combustor panel mounted to an radially outward of the inner shell. A grouping of the plurality of heat transfer pins may extend radially outward from the outer combustor panel and may extend radially inward from the inner combustor panel and may include a metallic coating.

In various embodiments, the grouping of the plurality of heat transfer pins is an aft grouping and may include a row of the heat transfer pins adjacent an aft edge of the outer combustor panel and the inner combustor panel. In various embodiments, a forward grouping of the heat transfer pins of the outer combustor panel and the inner combustor are uncoated. In various embodiments, the metallic coating may be disposed on aft and lateral portions of the aft grouping of the plurality of heat transfer pins of the outer combustor panel and the inner combustor panel.

Also disclosed herein, according to various embodiments, is a method of manufacturing a combustor. The method includes applying a metallic coating on a combustion facing surface of a combustor panel, applying the metallic coating on an edge of the aft combustor panel, and applying the metallic coating on a grouping of heat transfer pins extending from a cooling surface opposite the combustion facing surface of the aft combustor panel. In various embodiments, the combustor panel is an aft combustor panel, the edge is an aft edge, and the grouping of heat transfer pins is an aft grouping of heat transfer pins.

In various embodiments, the method further includes, after the applying the metallic coating on the combustion facing surface of the aft combustor panel, applying a ceramic coating on the combustion facing surface of the aft combustor panel. The method may further include preventing the ceramic coating from application on the aft grouping of the heat transfer pins extending from the cooling surface opposite the combustion facing surface of the aft combustor panel. In various embodiments, the method may be performed with the aft combustor panel mounted to a combustor shell. In various embodiments, the applying the metallic coating on the aft grouping of the heat transfer pins include applying the metallic coating on aft and lateral portions of the aft grouping of the heat transfer pins. In various embodiments, after the applying the metallic coating on the aft grouping of the heat transfer pins, a forward portion of the aft grouping of the heat transfer pins may be uncoated.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
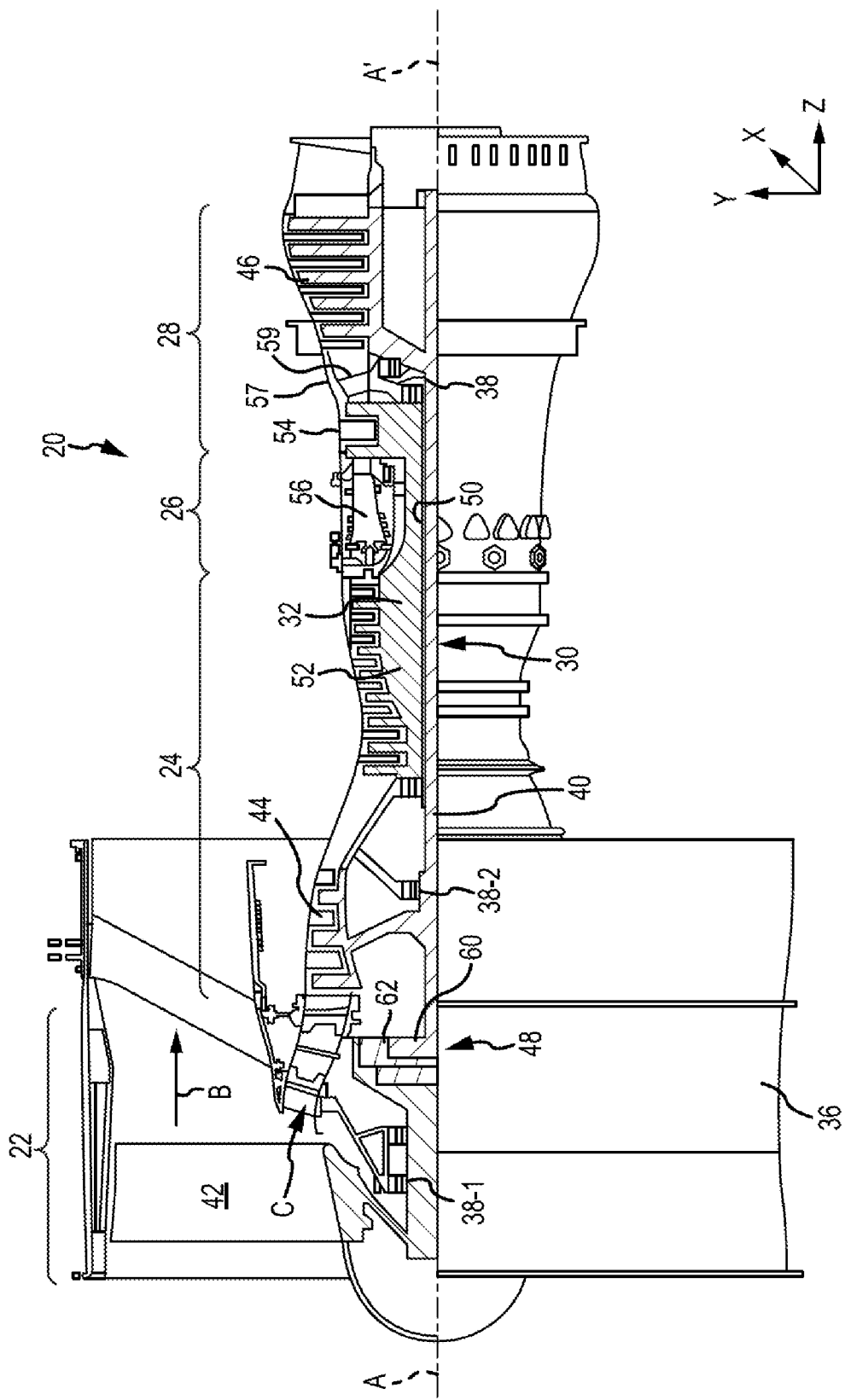
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

As mentioned above, the high operating temperatures and pressure ratios of the combustion gases in the combustor section 26 may create operating environments that damage the various components, such as the combustor panels, and thereby shorten the operational life of the combustor panels. As disclosed herein, a metallic coating may be applied to an aft grouping of heat transfer pins extending from the combustor panels, which results in improved heat transfer and thus prolongs the operational life of the combustor panels.

Figure 2:
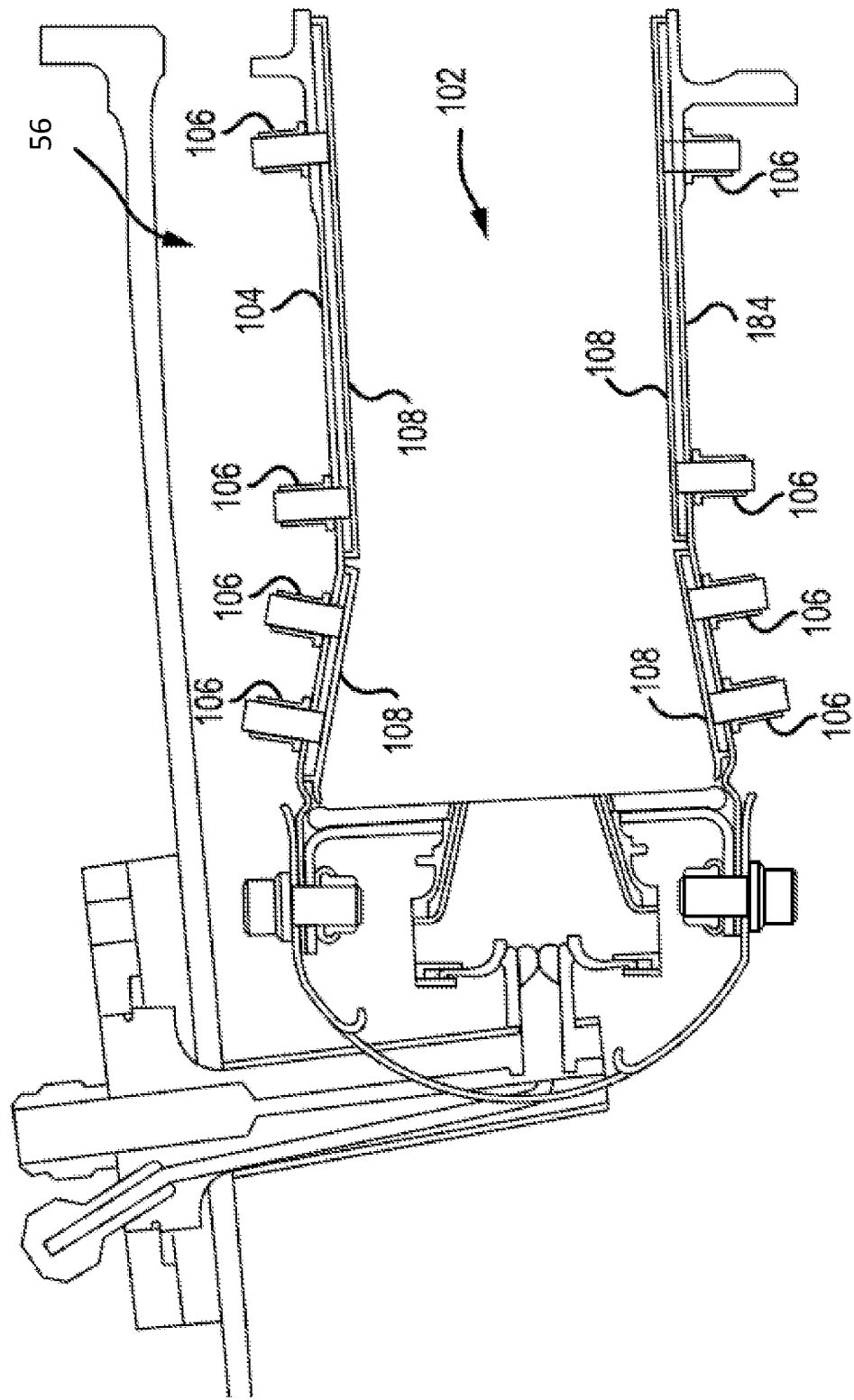
FIG. 2 illustrates a cross-sectional view of a combustor of gas turbine engine, in accordance with various embodiments.

With reference to FIG. 2, an in accordance with various embodiments, one or more combustor thermal shields 108 may be positioned in combustor 56 to protect various features of the combustor 56 from the high temperature flames and/or combustion gases. The combustor 56, in various embodiments, may have a combustor chamber 102 defined by a combustor outer shell 104 and a combustor inner shell 184. The combustor chamber 102 may form a region of mixing of core airflow C (with brief reference to FIG. 1) and fuel, and may direct the high-speed exhaust gases produced by the ignition of this mixture inside the combustor 56. The combustor outer shell 104 and the combustor inner shell 184 may provide structural support to the combustor 56 and its components. For example, a combustor outer shell 104 and a combustor inner shell 184 may comprise a substantially cylindrical canister portion defining an inner area comprising the combustor chamber 102.

As mentioned above, it may be desirable to protect the combustor outer shell 104 and the combustor inner shell 184 from the harmful effects of high temperatures. Accordingly, one or more combustor thermal shields 108 may be disposed inside the combustor chamber 102 and may provide such protection.

The combustor thermal shields 108 may comprise a partial cylindrical or conical surface section (e.g., may have a cross-section comprising an arc length). An outer combustor thermal shield may be arranged radially inward of the combustor outer shell 104, for example, circumferentially about the inner surface of the combustor outer shell 104 and one or more inner combustor thermal shields may also be arranged radially outward of the combustor inner shell 184. The combustor thermal shields 108 may comprise a variety of materials, such as metal, metal alloys, and/or ceramic matrix composites, among others.

Figure 3:
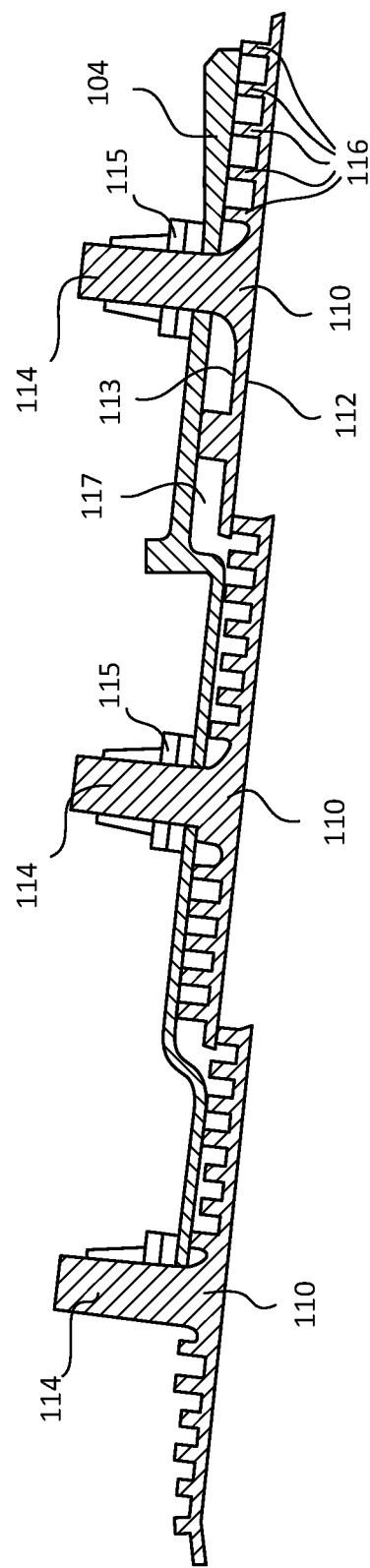
FIG. 3 illustrates a cross-sectional view of a combustor panel of a combustor of a gas turbine engine, in accordance with various embodiments.

With reference to FIG. 3 and as mentioned above, the combustor thermal shields 108 may be made from a plurality of combustor panels 110, in accordance with various embodiments. The combustor panels 110 may include attachment features 114 and heat transfer pins 116. A combustor panel 110 may be made of a thermal insulator material. The combustor panel 110 may be made from partial cylindrical or conical surface sections. The combustor panels 110 may be directly exposed to the heat and/or flame in the combustor chamber 102. In various embodiments, the combustor panels 110 may include a combustion facing surface 112 and a cooling surface 113 opposite the combustion facing surface 112. Thus, the combustor panels 110 may be made of any suitable heat tolerant material. In this manner, the combustor panels 110 may be substantially resistant to thermal mechanical fatigue in order to inhibit cracking of the combustor panels 110 and/or to inhibit liberation of portions of the combustor panels 110. In various embodiments, the combustor panel 110 may be made from a nickel based alloy and/or a cobalt based alloy, among others. For example, the combustor panel may be made from a high performance nickel-based super alloy. In various embodiments, the combustor panel 110 may be made from a cobalt-nickel-chromium-tungsten alloy.

The one or more attachment features 114 of the combustor panels 110 facilitate coupling and/or mounting of the combustor panels 110 to the respective shells 104, 184 of the combustor 56. In various embodiments, the attachment features 114 may be a boss or a stud extending radially outward relative to the combustor panel 110. In various embodiments, the attachment feature 114 is a cylindrical boss, such as a threaded pin, or may be a rectangular boss, such as for receiving a clip, or may be any other apparatus whereby the combustor panel 110 is mounted to the combustor outer shell 104 or the combustor inner shell 184. In various embodiments, the attachment feature 114 comprises a threaded stud that extends through a corresponding aperture in the combustor outer shell 104 or the combustor inner shell 184, and is retained in position by an attachment nut 115 disposed outward of the combustor outer shell 104 and torqued so that the attachment feature 114 is preloaded with a retaining force and securely affixes the combustor thermal panel 110 in a substantially fixed position relative to the combustor outer shell 104 or the combustor inner shell 184.

The heat transfer pins 116, according to various embodiments, are pins extending radially from the cooling surface 113 of the combustor panel 110. The heat transfer pins 116 may be cylindrical or may have a rectangular or other polygonal cross-sectional shape. In various embodiments, the heat transfer pins 116 may be spaced apart from a surface of the combustor outer shell 104 or the combustor inner shell 184 or the heat transfer pins 116 may be in contact with a surface of the combustor outer shell 104 or the combustor inner shell 184. As mentioned above, the space between the respective combustor outer shell 104 and the combustor inner shell 184 and the combustor panel is defined herein as an annular cooling cavity 117.

In various embodiments, the combustor panels 110 are made by casting a metal material to form the attachment features 114 and the heat transfer pins 116. Increasing the number of heat transfer pins on a combustor panel may increase the heat transfer capability of the combustor panel, but due to limitations or expenses of casting and/or forging manufacturing methods, further decreasing of the space between adjacent heat transfer pins may result in "bridging" between adjacent heat transfer pins. Such "bridging" would therefore decrease the effective surface area available for heat transfer. In other words, according to various embodiments and as described in greater detail below, there may be a practical manufacturing limitation on how small the spacing between adjacent heat transfer pins can be.

Figure 4:
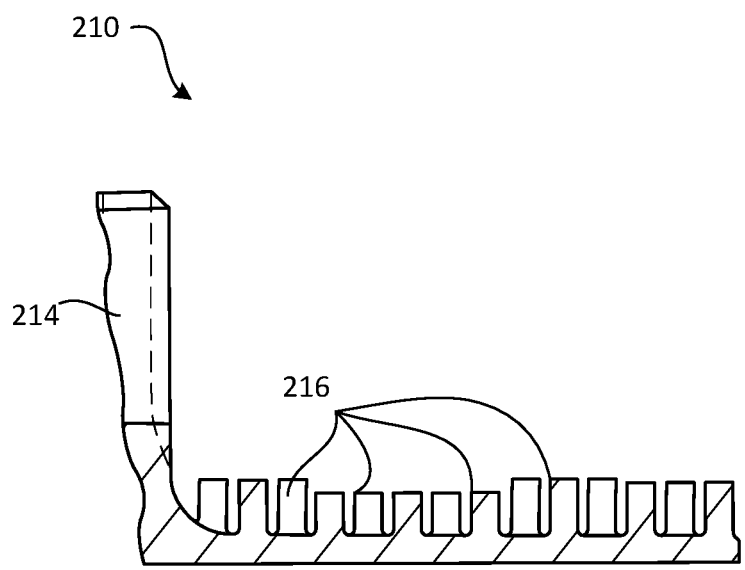
FIG. 4 illustrates a cross-sectional view of heat transfer pins of a combustor panel, in accordance with various embodiments.

FIG. 4, in accordance with various embodiments, illustrates a combustor panel 210 having an attachment feature 214 and heat transfer pins 216. As mentioned above, like numbers refer to like elements, thus combustor panel 210 shown in FIG. 4 may be similar and analogous to the combustor panel 210 shown in FIG. 3. In various embodiments, the combustor panel 210 shown in FIG. 4 may be the aft-most combustor panel of the combustor 56. That is, the aft combustor panel 210 is the last combustor panel of the combustor 56 before the combustion gases enter the turbine section 28. The temperature of the combustion gases at this stage in the combustor may be comparatively hotter than combustion gases upstream, according to various embodiments. In various embodiments, the combustor panel 210 may be a forward-most combustor panel of the combustor 56 and the temperature of the combustion gases at this forward stage of the combustor may be comparatively hotter than combustion gases downstream.

Figure 5:
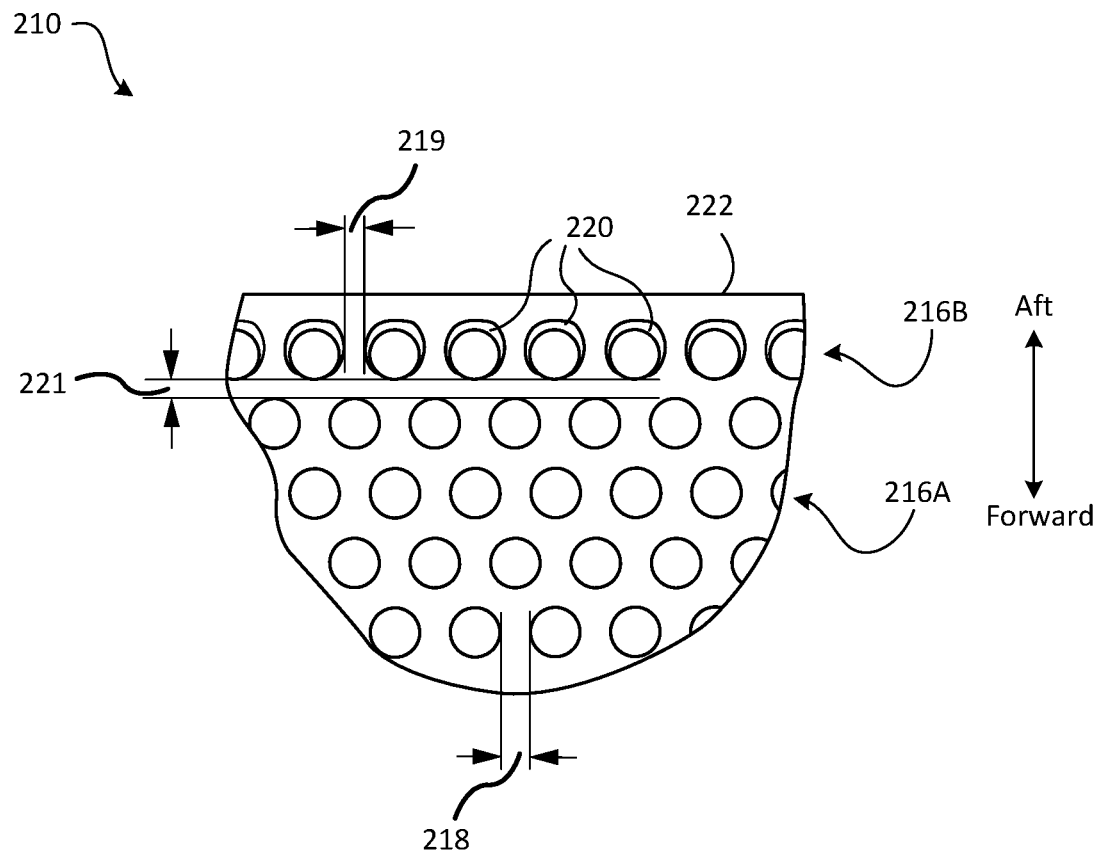
FIG. 5 illustrates a radially inward plan view of an aft grouping of heat transfer pins of a combustor panel having a metallic coating, in accordance with various embodiments.

FIG. 5, in various embodiments, illustrates a radial plan view of the aft combustor panel 210 after a metallic coating 220 has been applied to an aft grouping 216B of the heat transfer pins 216. That is, a forward grouping 216A of the heat transfer pins may be disposed forward on the aft combustor panel 210 relative to the aft grouping 216B of the heat transfer pins. In various embodiments, the forward grouping 216A of the heat transfer pins may be free of the metallic coating 220 and the aft grouping 216B of the heat transfer pins may have the metallic coating 220 applied thereon. Said differently, the forward grouping 216A of the heat transfer pins may be uncoated and the aft grouping 216B of the heat transfer pins may be coated with the metallic coating 220. In various embodiments, the aft grouping 216B of the heat transfer pins 216 may include a last, aft row of the heat transfer pins adjacent an aft edge 222 of the aft combustor panel 210. In various embodiments, the aft grouping may include two or more of the last, aft rows of the heat transfer pins. For example, the aft grouping 216B of the heat transfer pins 216 may include the last five aft rows, according to various embodiments.

In various embodiments, the metallic coating 220 may include any suitable metal or metal alloy material that may be applied using a physical vapor deposition process or a low pressure plasma spray process. For example, in one embodiment the metallic coating is an alloy of chromium aluminum alloy that includes nickel, cobalt, iron, and/or mixtures thereof. In various embodiments, the metallic coating 220 may be a first stage bond coating, as described in greater detail below, that is used to treat combustion facing surfaces of the combustor.

In various embodiments, the metallic coating 220 is applied on aft and lateral portions of the aft grouping 216B of the heat transfer pins. That is, according to various embodiments, a forward portion of each pin of the aft grouping 216B of the heat transfer pins may be free of metallic coating. The application of the metallic coating 220 increases the surface area of the aft grouping 216B of the heat transfer pins, thus improving the capability of the combustor panel to transfer heat, especially adjacent the aft edge 222 of the aft combustor panel 210, and improving oxidation resistance. In other words, the circumferential distance 219 between adjacent heat transfer pins in the aft grouping 216B may be less than the circumferential distance 218 between adjacent heat transfer pins in the forward grouping 216A. In various embodiments, the circumferential distance 219 between adjacent heat transfer pins in the aft grouping 216B may be between about 0.010 inches and about 0.040 inches (0.25-1.0 millimeters). As used in this context relating to the circumferential distance 219 between adjacent heat transfer pins in the aft grouping 216B, the term "about" is defined as plus or minus 0.005 inches (0.13 millimeters). In various embodiments, the circumferential distance 219 between adjacent heat transfer pins in the aft grouping 216B may be less than about 0.020 inches (0.5 millimeters).

In various embodiments, the axial distance between adjacent rows of heat transfer pins may remain unchanged after the application of the metallic coating 220. In various embodiments, as described in greater detail below, the metallic coating 220 may be a first stage bond coating that may be applied on the combustion facing surface 112 of the combustor panels 110.

Figure 6:
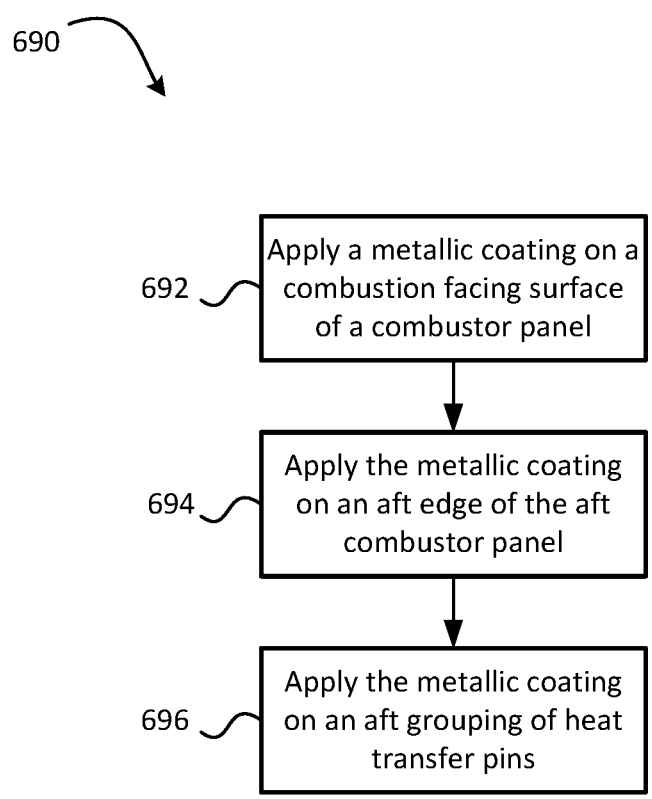
FIG. 6 is a schematic flowchart diagram of a method of manufacturing a combustor, in accordance with various embodiments.

In various embodiments, and with reference to FIG. 6, a method 690 of manufacturing a combustor is disclosed. The method 690 may include applying a metallic coating 220 on a combustion facing surface of an aft combustor panel 210 at step 692. The method 690 may further include applying the metallic coating 220 on an aft edge 222 of the aft combustor panel 210 at step 694. The method 690 may also include applying the metallic coating on an aft grouping 216B of heat transfer pins that extend from a cooling surface 113 opposite the combustion facing surface 112 of the aft combustor panel 210 at step 696. In various embodiments, as mentioned above, the metallic coating 220 may be a first stage bond coating applied on the combustion facing surface of the combustor panels. Accordingly, the method 690 may include applying (e.g., via physical vapor deposition process or a low pressure plasma spray process) the metallic coating 220 on the aft edge 222 and the aft grouping 216B of heat transfer pins of the aft combustor panel 210 during application of the metallic coating 220 on the combustion facing surface 112 of the combustor panels 110.

In various embodiments, the method 690 may further include, after the step 692 of applying the metallic coating 220 on the combustion facing surface 112 of the aft combustor panel 210, applying a ceramic coating on the combustion facing surface 112 of the aft combustor panel and preventing the ceramic coating from application on the aft grouping 216B of the heat transfer pins extending from the cooling surface 113 opposite the combustion facing surface 112 of the aft combustor panel 210. That is, according to various embodiments, the ceramic coating may be prevented from being applied onto the aft grouping 216B of the heat transfer pins as the ceramic would thermally insulate the heat transfer pins, thus reducing the capability of the heat transfer pins to transfer heat away from the combustion chamber.

In various embodiments, the method 690 may be performed with the combustor 56 assembled. That is, the combustor panels 110 may be mounted to the combustor shells 104, 184 during application of the metallic coating 220. Accordingly, in various embodiments, the metallic coating may be applied from, for example, a spray device that is positioned aft of and/or in between the inner and outer combustor panels. In various embodiments, the step 696 of applying the metallic coating 220 on the aft grouping 216B of the heat transfer pins may include applying the metallic coating 220 on aft and lateral portions of the aft grouping of the heat transfer pins. In various embodiments, after the step 696 of applying the metallic coating on the aft grouping 216B of the heat transfer pins, a forward portion of the aft grouping of the heat transfer pins may be free of the metallic coating 220.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a combustor, the method comprising:
    applying a metallic coating on a combustion facing surface of an aft combustor panel;
    applying the metallic coating on an aft edge of the aft combustor panel;
    applying the metallic coating on an aft grouping of heat transfer pins extending from a cooling surface opposite the combustion facing surface of the aft combustor panel;
    after the applying the metallic coating on the combustion facing surface of the aft combustor panel, applying a ceramic coating on the combustion facing surface of the aft combustor panel; and
    preventing the ceramic coating from application on the aft grouping of heat transfer pins extending from the cooling surface opposite the combustion facing surface of the aft combustor panel.

2. The method of claim 1, wherein the method is performed with the aft combustor panel mounted to a combustor shell.

3. The method of claim 1, wherein the applying the metallic coating on the aft grouping of heat transfer pins comprises applying the metallic coating on aft and lateral portions of the aft grouping of heat transfer pins.

4. The method of claim 3, wherein after the applying the metallic coating on the aft grouping of heat transfer pins, a forward grouping of heat transfer pins extending from the cooling surface is uncoated.

5. The method of claim 4, wherein a first circumferential distance between a first heat transfer pin of the aft grouping of heat transfer pins and a second heat transfer pin of the aft grouping of heat transfer pins is less than a second circumferential distance between a third heat transfer pin of the forward grouping of heat transfer pins and a fourth heat transfer pin of the forward grouping of heat transfer pins, the second heat transfer pin being adjacent to the first heat transfer pin, and the fourth heat transfer pin being adjacent to the third heat transfer pin, wherein the metallic coating is applied to the first heat transfer pin and the second heat transfer pin, and wherein the third heat transfer pin and the fourth heat transfer pin are uncoated.

6. The method of claim 4, wherein after the applying the metallic coating on the aft grouping of heat transfer pins, an axial distance between the aft grouping of heat transfer pins and the forward grouping of heat transfer pins remains unchanged.

7. The method of claim 1, wherein the aft grouping of heat transfer pins comprises between one and five rows of heat transfer pins adjacent the aft edge of the aft combustor panel.

8. The method of claim 1, wherein the metallic coating is a first stage bond coating applied to the combustion facing surface.

* * * * *